(12) United States Patent
Imai et al.

(10) Patent No.: US 12,340,522 B1
(45) Date of Patent: Jun. 24, 2025

(54) COMPUTER, INFORMATION PROCESSING SYSTEM, AND INFORMATION PROCESSING METHOD

(71) Applicant: Knowhere, Inc., Tokyo (JP)

(72) Inventors: Tatsuya Imai, Tokyo (JP); Hisashi Ito, Tokyo (JP)

(73) Assignee: KNOWHERE, INC., Tokyo (JP)

( * ) Notice: Subject to any disclaimer, the term of this patent is extended or adjusted under 35 U.S.C. 154(b) by 0 days.

(21) Appl. No.: 18/902,020

(22) Filed: Sep. 30, 2024

(30) Foreign Application Priority Data

May 10, 2024 (JP) ................................. 2024-077156

(51) Int. Cl.
*G06T 7/20* (2017.01)
*G06V 10/774* (2022.01)

(52) U.S. Cl.
CPC .............. *G06T 7/20* (2013.01); *G06V 10/774* (2022.01); *G06T 2207/30241* (2013.01)

(58) Field of Classification Search
CPC ............ G06T 7/20; G06T 2207/30241; G06V 10/774
See application file for complete search history.

(56) References Cited

U.S. PATENT DOCUMENTS

| | | | |
|---|---|---|---|
| 2021/0407316 A1* | 12/2021 | Shin | G06V 20/20 |
| 2022/0233942 A1* | 7/2022 | Ferrabee | G06T 7/75 |
| 2023/0072888 A1* | 3/2023 | Kim | G06N 20/00 |
| 2023/0136449 A1* | 5/2023 | Lemauf | H04N 7/183 |
| | | | 382/103 |
| 2023/0186493 A1* | 6/2023 | Lee | H04N 23/61 |
| | | | 348/139 |

FOREIGN PATENT DOCUMENTS

| | | | | |
|---|---|---|---|---|
| JP | H11-14652 A | | 1/1999 | |
| JP | 2008-538085 A | | 10/2008 | |
| JP | 2008-284166 A | | 11/2008 | |
| JP | 2021-505324 A | | 2/2021 | |
| JP | 2022-507399 A | | 1/2022 | |
| JP | 2022507399 | * | 1/2022 | ............ B25J 9/1697 |
| KR | 20190031111 | * | 3/2019 | ............ A63B 24/00 |
| KR | 10-2023-0156256 A | | 11/2023 | |
| KR | 20230156256 | * | 11/2023 | ......... A63B 24/0003 |

OTHER PUBLICATIONS

Notice of Reasons for Refusal mailed on May 31, 2024, received for JP Application 2024-077156, 6 pages including English Translation.
Decision to Grant mailed on Jul. 5, 2024, received for JP Application 2024-077156, 5 pages including English Translation.

* cited by examiner

*Primary Examiner* — Amara Abdi
(74) *Attorney, Agent, or Firm* — XSENSUS LLP

(57) ABSTRACT

A training data generation unit 111 generates a plurality of sets of trajectory information each indicating position change with respect to time change during flight of a learning ball, respectively based on a plurality of different flight states which are states of the learning ball that is flying, and further generates a plurality of training data each including the flight state and the trajectory information associated with each other, and a model generation unit 112 generates an estimation model for estimating the flight state from the trajectory information, through learning using the plurality of training data.

14 Claims, 7 Drawing Sheets

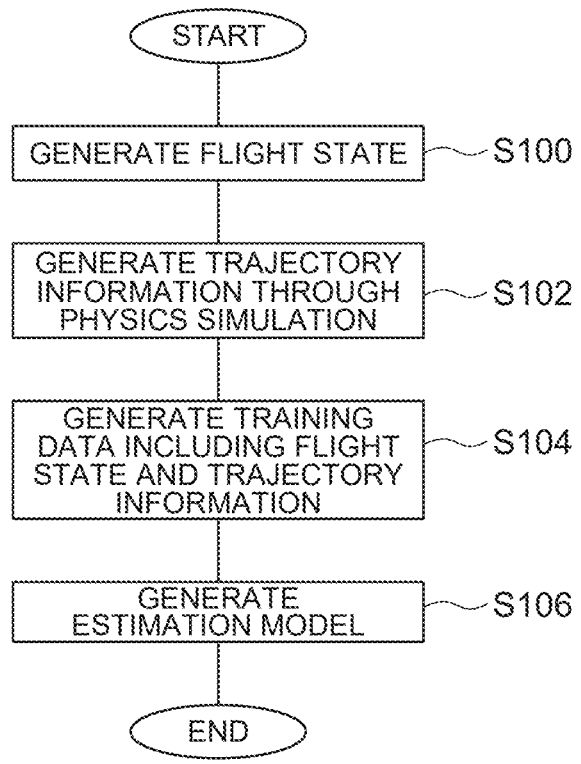
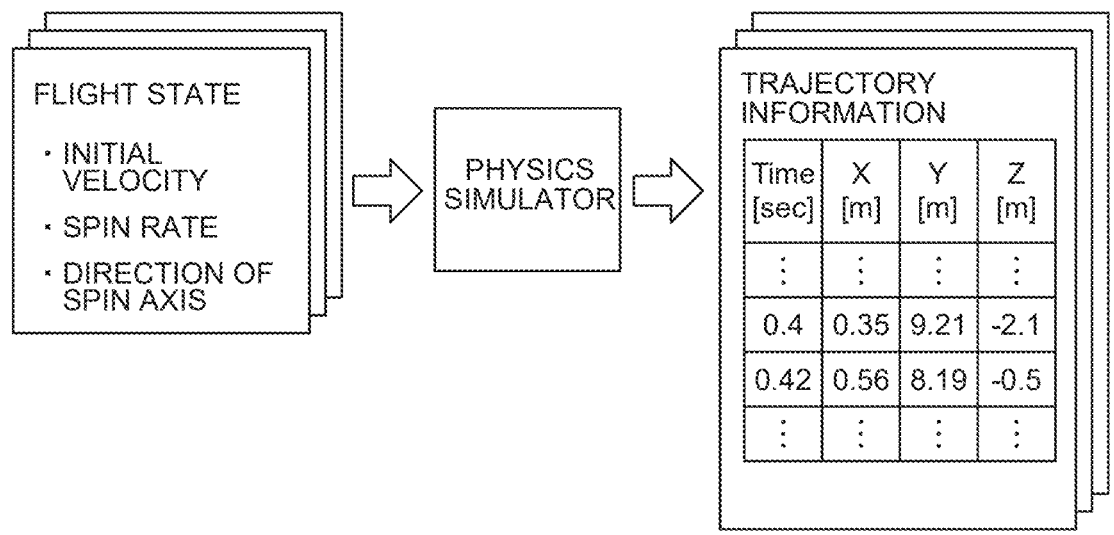

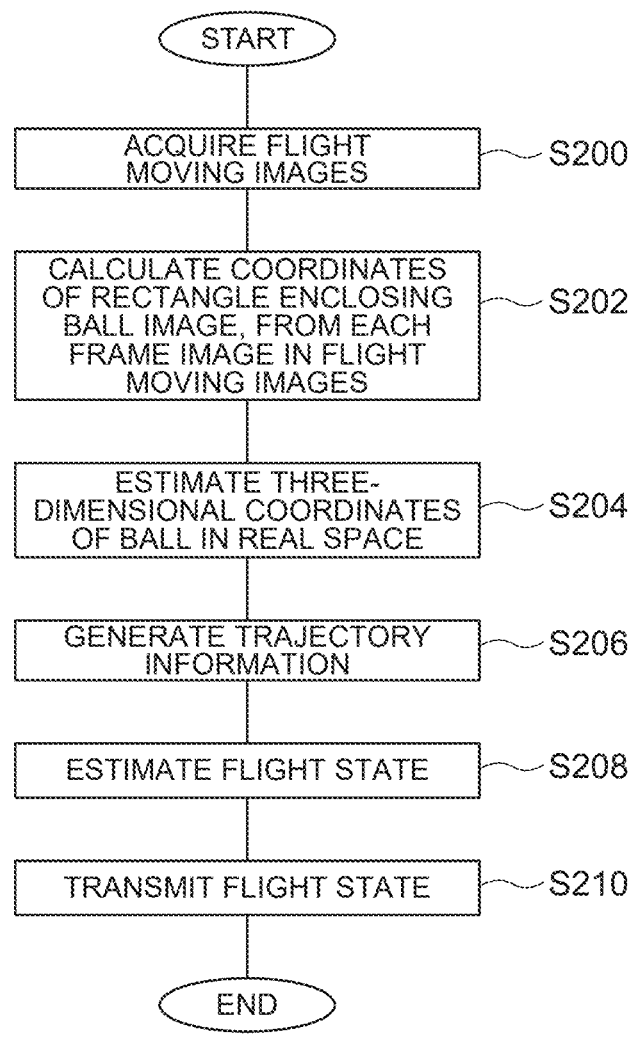

COMPUTER, INFORMATION PROCESSING SYSTEM, AND INFORMATION PROCESSING METHOD

CROSS-REFERENCE TO RELATED APPLICATION

This application claims priority from Japanese Patent Application No. 2024-077156, filed on May 10, 2024. The entire teachings of the above application are incorporated herein by reference.

TECHNICAL FIELD

The present invention relates to a computer, an information processing system, and an information processing method.

BACKGROUND ART

Conventionally, there have been known technologies for measuring the velocity of a ball thrown by a pitcher in baseball or the like. For example, Japanese Laid-Open Patent Publication No. H11-14652 (JP1999-14652A) discloses a technology of calculating the velocity of an object based on an integral value of an acceleration detected by acceleration detection means which is attached to a human body and detects the acceleration of a motion of the human body through an action of the human body throwing the object.

SUMMARY OF THE INVENTION

In such conventional technologies, calculation of an initial velocity or the like of a ball has been performed and improvement in accuracy thereof is desired.

Considering the above circumstances, an object of the present invention is to provide a computer, an information processing system, and an information processing method that can achieve improvement in estimation accuracy for a flight state.

A computer of the present disclosure includes: a training data generation unit configured to generate a plurality of sets of trajectory information each indicating position change with respect to time change during flight of a learning ball, respectively based on a plurality of different flight states which are states of the learning ball that is flying, and further generate a plurality of training data each including the flight state and the trajectory information associated with each other; a model generation unit configured to generate an estimation model for estimating the flight state from the trajectory information, through learning using the plurality of training data; a trajectory information acquisition unit configured to acquire trajectory information on an estimation target ball; and an estimation unit configured to estimate the flight state of the estimation target ball, based on the trajectory information acquired by the trajectory information acquisition unit, using the estimation model.

The computer of the present disclosure may further include: an image acquisition unit configured to acquire moving images of the estimation target ball that is flying; and a ball detection unit configured to detect the estimation target ball included in the moving images. The trajectory information acquisition unit may acquire the trajectory information on the detected estimation target ball.

In the computer of the present disclosure, the flight state may include at least one of a velocity, a spin rate, and a direction of a spin axis of the ball.

In the computer of the present disclosure, the training data generation unit may generate trajectory information according to an error distribution of a detection position of the estimation target ball that can be detected on the moving images, using a physics simulator, the physics simulator generating the trajectory information based on the flight state.

In the computer of the present disclosure, the training data generation unit may generate a plurality of sets of trajectory information including trajectory information corresponding to a trajectory of a false ball that can be erroneously detected by the ball detection unit, using a physics simulator, the physics simulator generating the trajectory information based on the flight state.

Another computer of the present disclosure includes: a trajectory information acquisition unit configured to acquire trajectory information indicating position change with respect to time change during flight of an estimation target ball; and an estimation unit configured to estimate a flight state which is a state of the estimation target ball that is flying, based on the trajectory information, using an estimation model. The estimation model is generated through the following: a plurality of sets of trajectory information each indicating position change with respect to time change during flight of a learning ball are generated respectively based on a plurality of different flight states which are states of the learning ball that is flying, a plurality of training data each including the flight state and the trajectory information associated with each other are generated, and learning using the plurality of training data is performed.

Another computer of the present disclosure includes: a training data generation unit configured to generate a plurality of sets of trajectory information each indicating position change with respect to time change during flight of a learning ball, respectively based on a plurality of different flight states which are states of the learning ball that is flying, and further generate a plurality of training data each including the flight state and the trajectory information associated with each other; and a model generation unit configured to generate an estimation model for estimating the flight state from the trajectory information, through learning using the plurality of training data.

An information processing system of the present disclosure includes: a portable terminal; and a computer. The computer includes a training data generation unit configured to generate a plurality of sets of trajectory information each indicating position change with respect to time change during flight of a learning ball, respectively based on a plurality of different flight states which are states of the learning ball that is flying, and further generate a plurality of training data each including the flight state and the trajectory information associated with each other, and a model generation unit configured to generate an estimation model for estimating the flight state from the trajectory information, through learning using the plurality of training data. The portable terminal includes a capturing unit configured to capture moving images of an estimation target ball that is flying, and a transmission unit configured to transmit the moving images to the computer. The computer further includes a moving image acquisition unit configured to acquire the moving images, a ball detection unit configured to detect the estimation target ball included in the moving images, a trajectory information acquisition unit configured to acquire trajectory information on the estimation target ball detected by the ball detection unit, and an estimation unit configured to estimate the flight state of the estimation target ball, based on the trajectory information acquired by the trajectory information acquisition unit, using the estimation model.

In the information processing system of the present disclosure, the flight state may include at least one of a velocity, a spin rate, and a direction of a spin axis of the ball.

In the information processing system of the present disclosure, the training data generation unit may generate trajectory information according to an error distribution of a detection position of the estimation target ball that can be detected on the moving images, using a physics simulator for generating the trajectory information, based on the flight state.

In the information processing system of the present disclosure, the training data generation unit may generate a plurality of sets of trajectory information including trajectory information corresponding to a trajectory of a false ball that can be erroneously detected by the ball detection unit, using a physics simulator for generating the trajectory information, based on the flight state.

An information processing method of the present disclosure is an information processing method performed by a computer including a control unit, the method including the steps of: the control unit generating a plurality of sets of trajectory information each indicating position change with respect to time change during flight of a learning ball, respectively based on a plurality of different flight states which are states of the learning ball that is flying, and further generating a plurality of training data each including the flight state and the trajectory information associated with each other; the control unit generating an estimation model for estimating the flight state from the trajectory information, through learning using the plurality of training data; the control unit acquiring trajectory information on an estimation target ball; and the control unit estimating the flight state of the estimation target ball, based on the trajectory information on the estimation target ball, using the estimation model.

The information processing method of the present disclosure may further include the steps of: acquiring moving images of the estimation target ball that is flying; and detecting the estimation target ball included in the moving images. In the step of acquiring the trajectory information on the estimation target ball, the trajectory information on the detected estimation target ball may be acquired.

In the information processing method of the present disclosure, the flight state includes at least one of a velocity, a spin rate, and a direction of a spin axis of the ball.

In the information processing method of the present disclosure, in the step of generating the training data, trajectory information according to an error distribution of a detection position of the estimation target ball that can be detected on the moving images may be generated, using a physics simulator for generating the trajectory information, based on the flight state.

In the information processing method of the present disclosure, in the step of generating the training data, a plurality of sets of trajectory information including trajectory information corresponding to a trajectory of a false ball that can be erroneously detected in the step of detecting the estimation target ball may be generated, using a physics simulator for generating the trajectory information, based on the flight state.

An information processing method of the present disclosure is an information processing method performed by a computer including a control unit, the method including the steps of: the control unit acquiring trajectory information indicating position change with respect to time change during flight of an estimation target ball; and the control unit estimating a flight state which is a state of the estimation target ball that is flying, based on the trajectory information, using an estimation model. The estimation model is generated through the following: a plurality of sets of trajectory information each indicating position change with respect to time change during flight of a learning ball are generated respectively based on a plurality of different flight states which are states of the learning ball that is flying, a plurality of training data each including the flight state and the trajectory information associated with each other are generated, and learning using the plurality of training data is performed.

An information processing method of the present disclosure is an information processing method performed by a computer including a control unit, the method comprising the steps of: the control unit generating a plurality of sets of trajectory information each indicating position change with respect to time change during flight of a learning ball, respectively based on a plurality of different flight states which are states of the learning ball that is flying, and further generating a plurality of training data each including the flight state and the trajectory information associated with each other; and the control unit generating an estimation model for estimating the flight state from the trajectory information, through learning using the plurality of training data.

BRIEF DESCRIPTION OF THE DRAWINGS

FIG. 5 is a flowchart showing a learning process.

FIG. 6 illustrates a trajectory information generation process.

FIG. 7 is a flowchart showing an estimation process.

DETAILED DESCRIPTION

Hereinafter, an embodiment of the present invention will be described with reference to the drawings. FIG. 1 to FIG. 8 show an information processing system, a computer, an information processing method, and the like according to the present embodiment.

Figure 1:
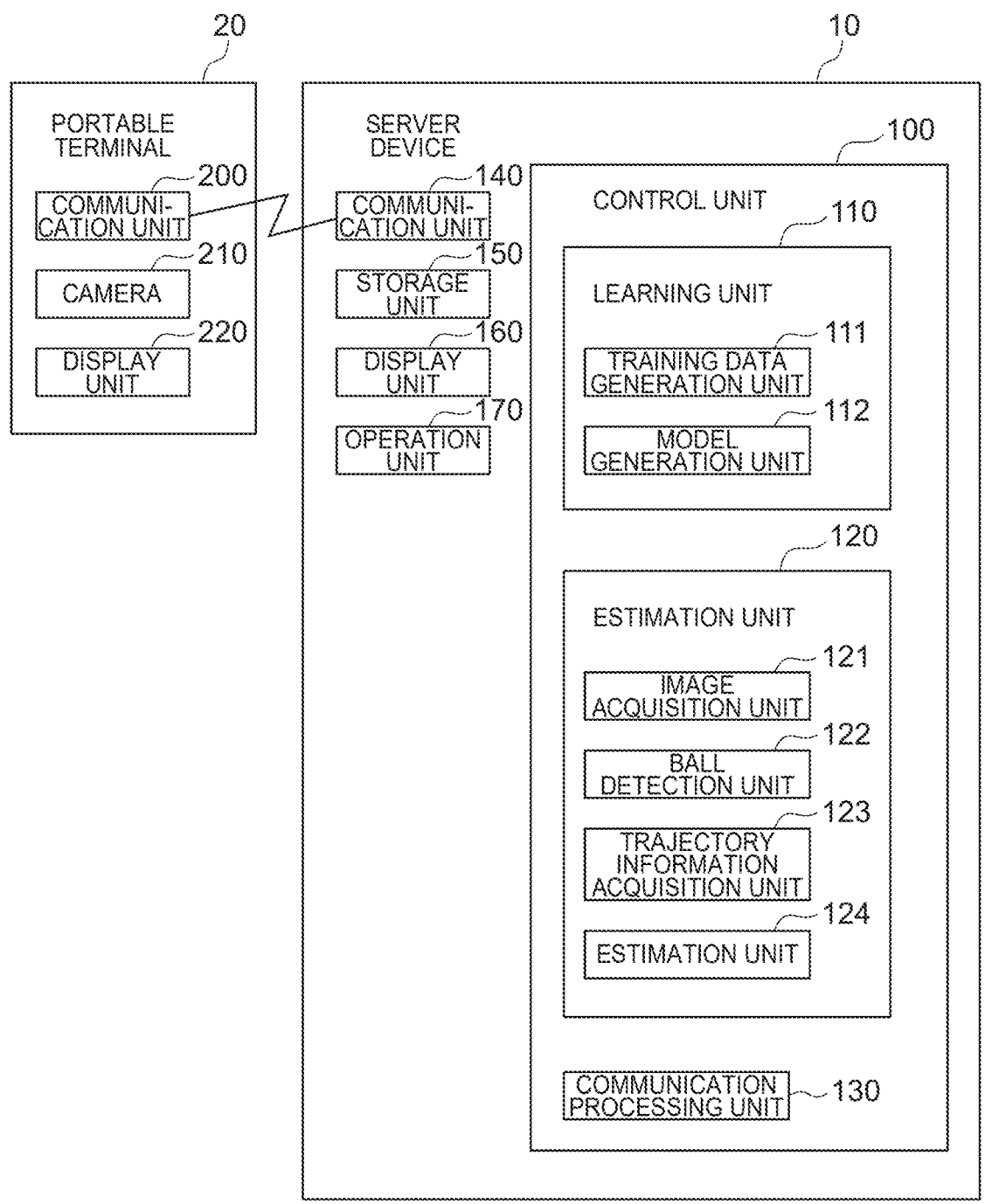
FIG. 1 is an entire configuration diagram of an information processing system.

FIG. 1 shows an entire configuration diagram of an information processing system 1 according to the present embodiment. The information processing system 1 is configured to, on moving images of a predetermined-size ball that is flying captured by a camera 210, estimate three-dimensional coordinates of the ball in a real space, and estimate a flight state from the three-dimensional coordinates.

Here, the flight state is information indicating the state of a thrown ball, i.e., the state of a ball that is flying. In the present embodiment, the flight state includes the velocity, the spin rate, and the direction of the spin axis at an initial time when the ball is thrown. Here, the direction of the spin axis is a tilt from the direction of a reference, where the reference is defined as a predetermined direction, e.g., a vertical direction, in a real space. The information processing system 1 of the present embodiment can estimate the flight state of a ball without preparation of a special camera or the like with its position fixed.

In the present embodiment, an estimation target ball is a baseball ball thrown by a baseball pitcher. An estimation target ball may be any ball that is flying, and the kind of the ball is not limited to that shown in the present embodiment. Other examples of the ball include a tennis ball shot by a tennis racket, a golf ball shot by a golf club, and a ball released from an apparatus such as a pitching machine.

The information processing system 1 includes a server device 10 and a portable terminal 20. The server device 10 is composed of a computer or the like, and includes a control unit 100, a communication unit 140, a storage unit 150, a display unit 160, and an operation unit 170.

The control unit 100 includes a central processing unit (CPU), a graphics processing unit (GPU), and the like, and controls operation of the server device 10. The communication unit 140 includes a communication interface for communicating with an external device wirelessly or via a wire. The control unit 100 transmits/receives data to/from the portable terminal 20 via the communication unit 140.

The storage unit 150 includes a hard disk drive (HDD), a random access memory (RAM), a read only memory (ROM), a solid state drive (SSD), and the like, for example. The storage unit 150 is not limited to a type provided in the server device 10, and may be a storage medium (e.g., a USB memory) that can be detachably mounted to the server device 10. In the present embodiment, the storage unit 150 stores an estimation model and a program to be executed by the control unit 100.

The display unit 160 is, for example, a monitor, and displays various screens by receiving a display command from the control unit 100. The operation unit 170 is, for example, a keyboard, and can give various commands to the control unit 100.

The portable terminal 20 includes a communication unit 200, the camera 210, and a display unit 220. The communication unit 200 includes a communication interface for communicating with an external device wirelessly or via a wire. The camera 210 captures moving images. In the present embodiment, the camera 210 captures moving images (hereinafter, referred to as flight moving images) of a ball that is flying. The flight moving images captured by the camera 210 are transmitted to the server device 10 via the communication unit 200. The display unit 220 is, for example, a monitor, and displays various screens. The display unit 220 displays flight moving images, for example.

As the portable terminal 20, a smartphone, a PC tablet, or the like may be used, for example. As the portable terminal 20, a video camera or the like capable of communicating with an external device may be used.

In the present embodiment, a capturing application can be installed on the portable terminal 20. When the capturing application installed on the portable terminal 20 is started, the capturing application allows the camera 210 to capture flight moving images. When flight moving images are transmitted to the server device 10, information on the angle of view or the focal length at the time of capturing the flight moving images is transmitted together with the flight moving images.

Information on the angle of view or the focal length at the time of capturing by the camera 210 may be allowed to be inputted on a browser displayed on the display unit 220 of the portable terminal 20. Then, when flight moving images are captured, the information on the angle of view or the focal length of the camera 210 inputted on the browser is transmitted from the portable terminal 20 to the server device 10.

Next, the configuration of the control unit 100 of the server device 10 will be described. The control unit 100 executes a program stored in the storage unit 150 described later, to function as a learning unit 110, an estimation unit 120, and a communication processing unit 130.

The learning unit 110 is a function unit that trains an estimation model to be used for specifying a flight state from position change of a ball that is flying. The estimation unit 120 acquires flight moving images from the portable terminal 20, estimates position change of a ball on the flight moving images, and estimates a flight state of the ball from the position change of the ball. In estimation of the flight state, the estimation model generated by the learning unit 110 is used.

The learning unit 110 includes a training data generation unit 111 and a model generation unit 112. The estimation unit 120 includes an image acquisition unit 121, a ball detection unit 122, a trajectory information acquisition unit 123, and an estimation unit 124. Hereinafter, processing described as being performed by each of the training data generation unit 111, the model generation unit 112, the image acquisition unit 121, the ball detection unit 122, the trajectory information acquisition unit 123, the estimation unit 124, and the communication processing unit 130 is processing performed by the control unit 100 executing the program.

Figure 2:
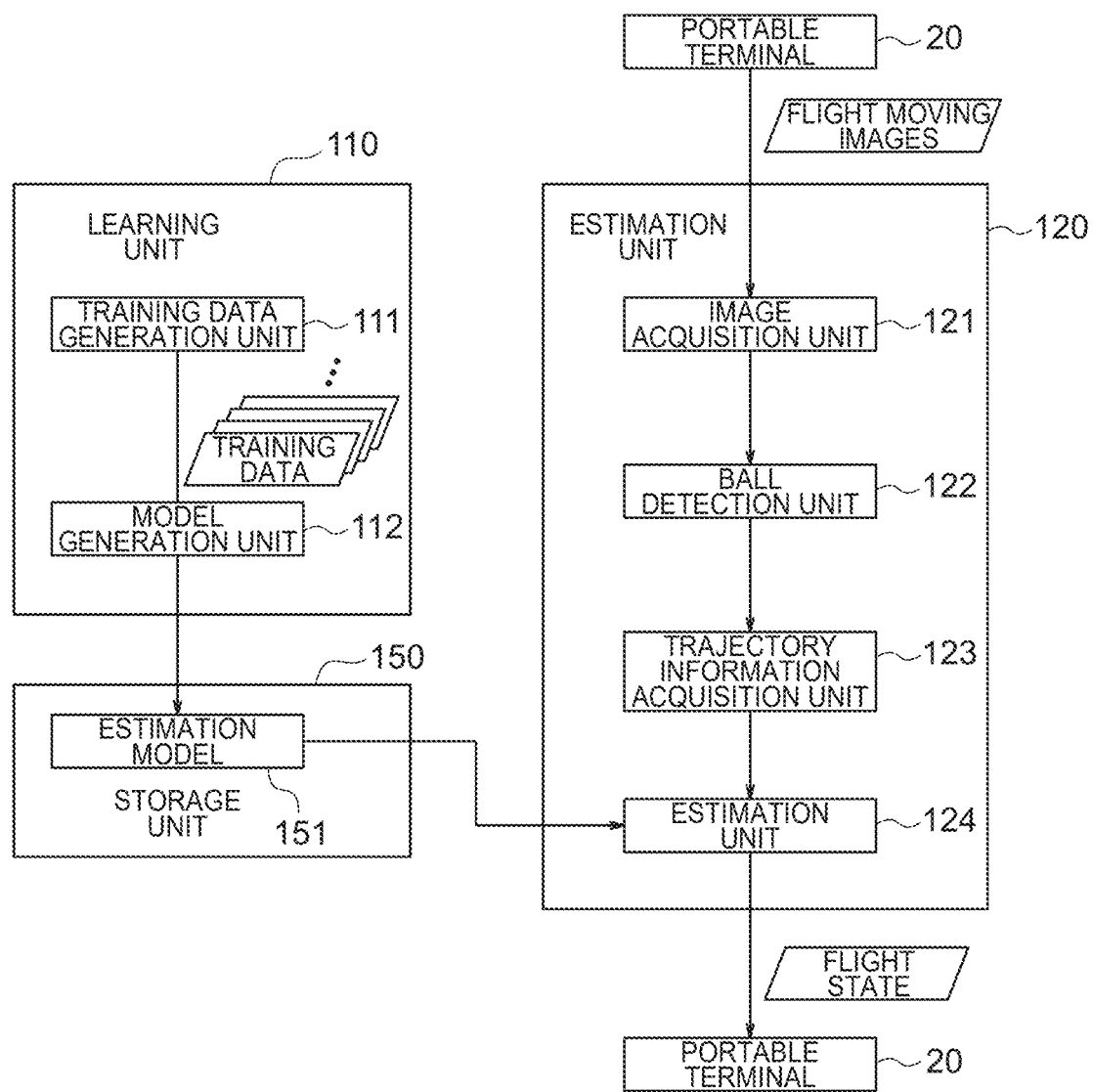
FIG. 2 illustrates flow of data in a learning unit and an estimation unit.

FIG. 2 illustrates flow of data in the learning unit 110 and the estimation unit 120. The training data generation unit 111 of the learning unit 110 generates training data to be used for generating the estimation model. The model generation unit 112 generates an estimation model 151 through machine learning using the training data generated by the training data generation unit 111. As the machine learning, various known methods such as deep learning may be used. The estimation model 151 is stored in the storage unit 150.

Meanwhile, in the estimation unit 120, the image acquisition unit 121 acquires flight moving images transmitted from the portable terminal 20, via the communication unit 140. The ball detection unit 122 detects an image of a ball from each frame image included in the flight moving images, and estimates the position of the ball in a real space.

Figure 3A:
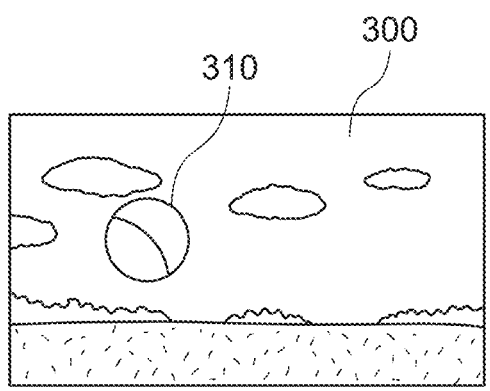
FIGS. 3A and 3B illustrate processing for ball detection.
Figure 3B:
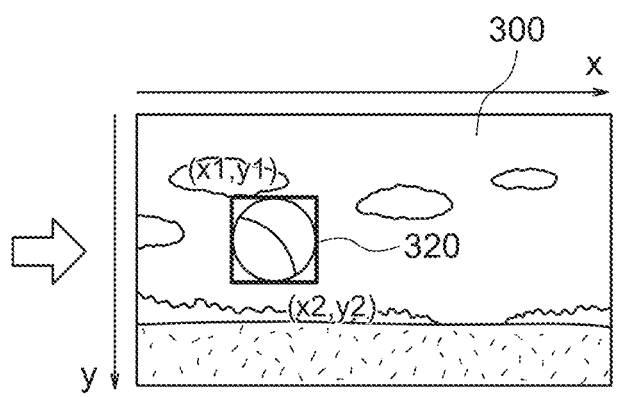

Hereinafter, processing by the ball detection unit 122 will be described with reference to FIG. 3 and FIG. 4. FIG. 3(a) shows a frame image 300 including a ball image 310 of an estimation target ball that is flying. Based on image feature quantities, the ball detection unit 122 generates a rectangle 320 as a bounding box enclosing the ball image 310 as shown in FIG. 3(b), from the frame image 300. Here, y coordinates of an upper side and a lower side of the rectangle 320 on the frame image 300 are a y coordinate (y1) of a pixel at which the y coordinate is smallest of all pixels representing the color of the ball image 310, and a y coordinate (y2) of a pixel at which the y coordinate is greatest, respectively. In addition, x coordinates of a left side and a right side of the rectangle 320 on the frame image 300 are an x coordinate (x1) of a pixel at which the x coordinate is smallest of all the pixels representing the color of the ball image 310, and an x coordinate (x2) of a pixel at which the x coordinate is greatest, respectively. The coordinates of four corners of the rectangle 320 are represented by (x1, y1), (x1, y2), (x2, y2), and (x2, y1).

As another example, the ball detection unit 122 may calculate the coordinates of the four corners of the rectangle 320 enclosing the ball image 310, using an estimation model for estimating the coordinates of the four corners of the rectangle 320 for the ball image from an image. The estimation model is generated through various known machine learning methods such as deep learning, using training data including frame images, ball images, and coordinates of four corners of rectangles enclosing the ball images, for example.

The ball detection unit 122 calculates direction vectors extending from the focal point of the lens of the camera 210 toward the ball (specifically, direction vectors extending toward the coordinates of the four corners around the ball image 310 of the estimation target ball), from the coordinates of the four corners of the rectangle 320 enclosing the ball image 310 and the angle of view (indicated by 430 in FIG. 4) of the camera 210.

Figure 4:
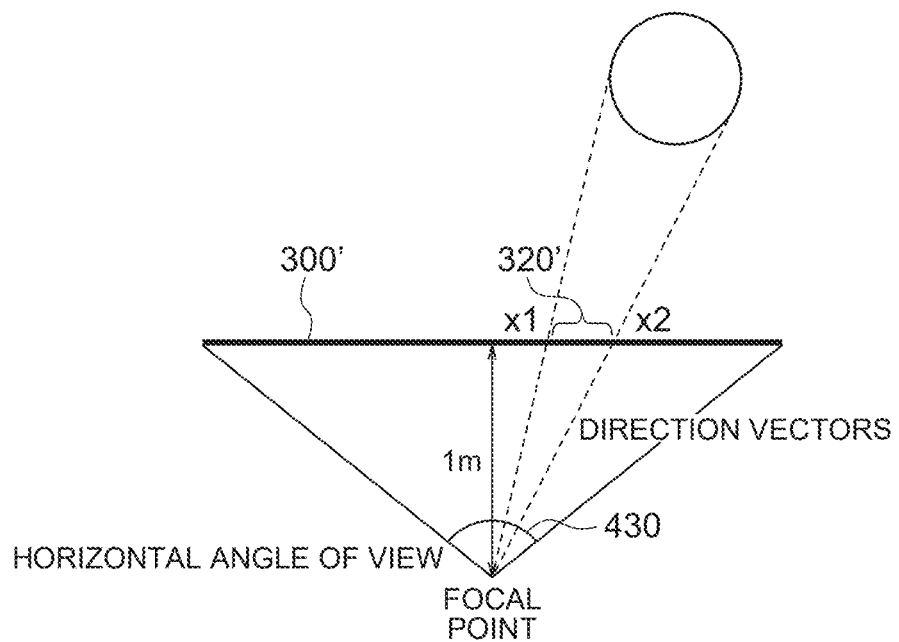
FIG. 4 illustrates processing for calculating direction vectors.

FIG. 4 illustrates processing of calculating the direction vectors. FIG. 4 is a view of the frame image 300 shown in FIG. 3, as seen directly from above. A segment representing the frame image 300 shown in FIG. 4 as seen from above is indicated by 300' in FIG. 4. In FIG. 4, for explanation, the three-dimensional coordinates of the actual ball corresponding to the ball image 310 in the real space are represented with the right direction defined as positive in the x coordinate, the drawing sheet depth direction defined as positive in the y coordinate, and the upward direction defined as positive in the z coordinate, with respect to the focal point of the lens of the camera 210 as an origin. Each direction vector is scaled with z=1 m. That is, the z coordinate of the direction vector in the three-dimensional coordinate system is set at 1 (unit: m). The x coordinates of all points on the left side of the rectangle 320 shown in FIG. 3 are x1, and the x coordinates of all points on the right side are x2. Therefore, the rectangle 320 shown in FIG. 3 is present between the coordinate x1 and the coordinate x2 in FIG. 3. A segment representing the rectangle 320 shown in FIG. 3 as seen from above is indicated by 320' in FIG. 4.

In the case where the direction vector is scaled with z=1 m, i.e., the z coordinate of the direction vector in the three-dimensional coordinate system is set at 1 (unit: m), if the horizontal width (number of pixels) of the image is w, the x coordinate of a direction vector extending toward the right side of the rectangle 320, in the three-dimensional coordinate system, is ((x2/w−0.5)×2×tan(horizontal angle of view/2)) (unit: m). Similarly, the x coordinate of a direction vector extending toward the left side of the rectangle 320, in the three-dimensional coordinate system, is ((x1/w−0.5)×2×tan (horizontal angle of view/2)) (unit: m). This is because the x coordinates at the left and right ends of the frame image 300 distant by 1 m from the focal point of the lens of the camera 210 are (±tan(angle of view/2)) (unit: m). The horizontal angle of view refers to an angle of view of the camera 210 in the horizontal direction.

Similarly, when the field of view of the camera 210 is seen directly from the side, the y coordinate of a direction vector extending toward the upper side of the rectangle 320, in the three-dimensional coordinate system, and the y coordinate of a direction vector extending toward the lower side of the rectangle 320, in the three-dimensional coordinate, can also be calculated. Specifically, in the case where the z coordinate of the direction vector in the three-dimensional coordinate system is set at 1 (unit: m), if the height (number of pixels) of the image is h, the y coordinate of a direction vector extending toward the upper side of the rectangle 320, in the three-dimensional coordinate system, is ((y1/h−0.5)×2×tan (vertical angle of view/2)) (unit: m). Similarly, the y coordinate of a direction vector extending toward the lower side of the rectangle 320, in the three-dimensional coordinate system, is ((y2/h−0.5)×2×tan(vertical angle of view/2)) (unit: m). The vertical angle of view refers to an angle of view of the camera 210 in the vertical direction.

The total number of components of the direction vectors to the four corners of the rectangle 320 is three components in the x direction, y direction, and the z direction×4 (coordinate sets of four corners)=12. However, the direction vectors are scaled with z=1 (unit: m), and the component values are the same between the x components of the upper left and lower left vectors, between the x components of the upper right and lower right vectors, between the y components of the upper left and upper right vectors, and between the y components of the lower left and lower right vectors. Therefore, elements of the direction vectors extending from the focal point of the lens of the camera 210 toward the ball are sufficient with the following four data.

(a) (x1/w−0.5)×2×tan(horizontal angle of view/2)
(b) (x2/w−0.5)×2×tan(horizontal angle of view/2)
(c) (y1/h−0.5)×2×tan(vertical angle of view/2)
(d) (y2/h−0.5)×2×tan(vertical angle of view/2)

By a known method, the direction vectors extending from the focal point of the lens of the camera 210 toward the ball may be calculated from the coordinates of the four corners of the rectangle 320 enclosing the ball image 310, and the focal length of the camera 210 instead of the angle of view of the camera 210. Here, the focal length of the camera 210 refers to a distance from the center point of the lens to an image sensor (film plane).

The ball detection unit 122 further estimates the three-dimensional coordinates of the ball corresponding to the ball image in the real space, based on the direction vectors. For example, the ball detection unit 122 estimates the three-dimensional coordinates of the center of the ball, based on the direction vectors, using a coordinate estimation model obtained through machine learning. More specifically, the ball detection unit 122 performs machine learning using training data including direction vectors extending toward a ball from the focal point of the lens of the camera 210 that has captured the ball and the three-dimensional coordinates of the ball in a real space. Thus, the ball detection unit 122 generates a coordinate estimation model for estimating the three-dimensional coordinates of a ball in a real space from direction vectors extending toward the ball from the focal point of the lens of the camera 210 and the angle of view or the focal length of the camera 210. By using the coordinate estimation model obtained as described above, the ball detection unit 122 estimates the three-dimensional coordinates of a ball in a real space, based on direction vectors.

As shown in FIG. 2, for each frame image included in the moving images, the trajectory information acquisition unit 123 acquires, as trajectory information on the ball, a series of data in which the three-dimensional coordinates of the ball obtained by the ball detection unit 122 and the time of the frame image when the three-dimensional coordinates were obtained are associated with each other. Here, the trajectory information is information indicating position change of a flying ball with respect to time change. Specifically, the trajectory information is information indicating the three-dimensional coordinates of a ball in a real space at each time.

The estimation unit 124 estimates a flight state from the trajectory information obtained from the flight moving images, using the estimation model 151 generated by the learning unit 110 and stored in the storage unit 150. The flight state is transmitted to the portable terminal 20 via the communication unit 140.

Next, processing by the learning unit 110 will be described in detail. FIG. 5 is a flowchart showing a learning process by the learning unit 110. FIG. 6 illustrates a trajectory information generation process. In the learning process, first, the training data generation unit 111 generates a flight state (step S100). In the present embodiment, a baseball ball thrown by a baseball pitcher is a processing target. Therefore, as shown in FIG. 6, as the flight state, the initial velocity, the spin rate, and the spin axis of a ball that can be thrown by a baseball pitcher are given. Thus, by the training data generation unit 111, a flight state which is the state of a ball given for learning is generated. Further, for generating an estimation model, a plurality of flight states for which conditions are different in terms of at least one of the initial velocity, the spin rate, and the spin axis, are generated.

Next, the training data generation unit 111 generates trajectory information indicating position change of a flying ball with respect to time change, through physics simulation using a physics simulator, based on the flight state generated in step S100 as an input (step S102). When a velocity, a spin rate, and a tilt of a spin axis of a thrown ball as initial values are inputted, the physics simulator predicts a trajectory of the ball flying under the inputted condition. Thus, as shown in FIG. 6, three-dimensional coordinates in a real space at each time are obtained.

Next, the training data generation unit 111 can obtain, as one training data, the flight state given as an input and the trajectory information obtained as an output in response to the flight state (step S104). In the same manner, the training data generation unit 111 obtains a plurality of training data. Next, using the plurality of training data obtained in step S104, the model generation unit 112 generates an estimation model for estimating a flight state from trajectory information, through machine learning (step S106).

On captured flight moving images of an actually flying ball, it is difficult to specify the flight state thereof. In contrast, for the flight state in the present embodiment, a plurality of training data conforming to an actually flying ball can be generated using physics simulation as described above.

Figure 8:
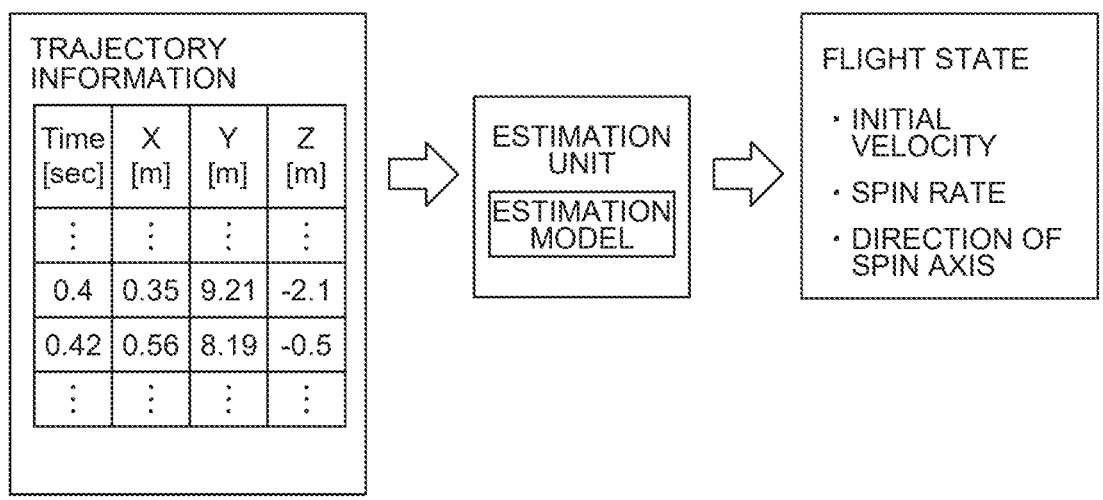
FIG. 8 illustrates a flight state estimation process.

Next, processing by the estimation unit 120 will be described in detail. FIG. 7 is a flowchart showing an estimation process by the estimation unit 120. FIG. 8 illustrates a flight state estimation process. In the estimation process, first, the image acquisition unit 121 acquires flight moving images of an estimation target ball captured by the camera 210, from the portable terminal 20 via the communication unit 140 (step S200). Next, the ball detection unit 122 calculates the coordinates of the rectangle 320 enclosing the ball image 310, from each frame image included in the flight moving images (step S202). Next, the ball detection unit 122 calculates direction vectors extending toward the ball from the focal point of the lens of the camera 210, based on the coordinates of the rectangle 320 enclosing the ball image 310, and estimates the three-dimensional coordinates of the ball in the real space, based on the direction vectors (step S204).

Next, the trajectory information acquisition unit 123 generates trajectory information including times of the respective frame images included in the flight moving images and the three-dimensional coordinates of the ball estimated from the respective frame images (step S206). Next, as shown in FIG. 8, the estimation unit 124 estimates a flight state from the trajectory information, using the estimation model 151 stored in the storage unit 150 (step S208). Next, the communication processing unit 130 transmits the flight state to the portable terminal 20 via the communication unit 140 (step S210). In the portable terminal 20, when the flight state is received, the display unit 220 displays the flight state. Thus, a user can recognize the velocity, the spin rate, and the tilt of the spin axis of the ball at an initial time, as the flight state.

As described above, the information processing system 1 of the present embodiment can improve estimation accuracy for a flight state. Further, in the information processing system 1 of the present embodiment, multiple training data conforming to an actually flying ball are generated, and an estimation model for estimating a flight state can be generated using the generated training data. In addition, physics simulation is used for generation of the training data. Therefore, the training data can be efficiently collected.

The computer, the information processing system, the information processing method, and the like of the present invention are not limited to those described above and the above embodiment may be modified variously.

In a first modification, the flight state may include at least one of the initial velocity, the initial spin rate, and the initial tilt of the spin axis of a ball. In addition, the flight state may include a change amount of a changing ball. Here, the change amount of a changing ball is a change amount from a flight position in a case where the spin rate is zero.

In a second modification, the flight state is not limited to an initial state when a ball is thrown. The flight state may be a state at a timing after a certain period from a timing when a ball is thrown, for example. In this case, the training data generation unit 111 calculates not only the velocity, the spin rate, and the tilt of the spin axis at an initial time but also the velocity, the spin rate, and the tilt of the spin axis at each time after that, through physics simulation using a physics simulator. Then, using these calculated values as training data, an estimation model for calculating the velocity, the spin rate, and the tilt of the spin axis of a ball at any time not limited to an initial time, from trajectory information, is generated.

In a third modification, the server device 10 may estimate a flight state, based on trajectory information obtained from flight moving images, and specific processing therefor is not limited to the above embodiment. For example, the server device 10 may estimate the velocity, the spin rate, and the direction of the spin axis of a ball at an initial time as a flight state, using a function having time change and position change indicated by trajectory information as coefficients.

A fourth modification will be described. In processing of extracting a rectangle enclosing a ball image from a frame image of flight moving images actually captured by a camera, an error of a detection position can occur. Such errors of a detection position often exhibit a distribution having a predetermined shape. In such a case, the training data generation unit 111 may generate trajectory information according to such an error distribution of a detection position. Specifically, for trajectory information generated by a physics simulator, the training data generation unit 111 corrects position information thereof so as to reproduce an error distribution. Thus, it is possible to accurately estimate a flight state even in a case where an error occurs in a detection position of a rectangle corresponding to a ball image.

A fifth modification will be described. Flight moving images actually captured by a camera can include a ball other than an estimation target ball. In such a case, the ball detection unit 122 might erroneously recognize another ball as an estimation target ball on some frame images of the flight moving images. Accordingly, also in training data, trajectory information corresponding to such another ball may be included. Specifically, the training data generation unit 111 obtains trajectory information so as to include trajectory information corresponding to a trajectory of a false ball that is flying, as well as a learning ball. Thus, it is possible to accurately estimate a flight state of an estimation target ball even in a case where a ball other than an estimation target ball is erroneously recognized as the estimation target ball.

In a sixth modification, at least a part of the processing described as being performed by the server device 10 may be performed in the portable terminal 20 or another device. For example, the estimation unit 120 may be provided in the portable terminal 20. In this case, the server device 10 generates an estimation model, and the generated estimation model is transmitted to the portable terminal 20. Then, the portable terminal 20 estimates a flight state from flight moving images, using the estimation model.

As another example, the image acquisition unit 121 and the ball detection unit 122 may be provided in the portable terminal 20. Then, the portable terminal 20 may generate trajectory information from flight moving images, and the portable terminal 20 may transmit the trajectory information, instead of the flight moving images, to the server device 10.

As another example, the processing of generating trajectory information from flight moving images may be performed by a device other than the server device 10 and the portable terminal 20. In this case, flight moving images may be transmitted from the portable terminal 20 to the other device. Then, the other device may generate trajectory information from the flight moving images, and the other device may transmit the trajectory information to the server device 10.

As another example, the learning unit 110 and the estimation unit 120 may be implemented in other devices. In this case, a first device including the learning unit 110 transmits an estimation model generated by the learning unit 110, to a second device including the estimation unit 120, and the second device estimates a flight state, using the estimation model generated by the first device.

In a seventh modification, trajectory information to be acquired by the trajectory information acquisition unit 123 is not limited to trajectory information obtained from flight moving images. For example, the trajectory information may be information obtained from a detection result by a radar.

The functionality of the elements disclosed herein may be implemented using circuitry or processing circuitry which includes general purpose processors, special purpose processors, integrated circuits, ASICs ("Application Specific Integrated Circuits"), a CPU (a Central Processing Unit), conventional circuitry and/or combinations thereof which are configured or programmed to perform the disclosed functionality. Processors are considered processing circuitry or circuitry as they include transistors and other circuitry therein. Processors may be a programmed processor which may execute programs stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In the computer, the information processing system, and the information processing method of the present embodiment configured as described above, the training data generation unit 111 generates a plurality of sets of trajectory information each indicating position change with respect to time change during flight of a learning ball, respectively based on a plurality of different flight states which are states of the learning ball that is flying, the model generation unit 112 generates an estimation model for estimating the flight state from the trajectory information, through learning using a plurality of training data, the trajectory information acquisition unit 123 acquires trajectory information on an estimation target ball, and the estimation unit 124 estimates the flight state of the estimation target ball, based on the trajectory information acquired by the trajectory information acquisition unit 123, using the estimation model. Thus, it is possible to estimate the flight state which is the state of the estimation target ball that is flying, from the trajectory information on the estimation target ball.

In the computer, the information processing system, and the information processing method of the present embodiment, the image acquisition unit 121 may acquire moving images of the estimation target ball that is flying, the ball detection unit 122 may detect the estimation target ball included in the moving images, and the trajectory information acquisition unit 123 may acquire the trajectory information on the detected estimation target ball. Here, the flight state may include at least one of a velocity, a spin rate, and a direction of a spin axis of the ball. In this case, it is possible to estimate the flight state of the estimation target ball, based on moving images of the estimation target ball that is flying.

In the computer, the information processing system, and the information processing method of the present embodiment, the training data generation unit 111 may generate trajectory information according to an error distribution of a detection position of the estimation target ball that can be detected on the moving images, using a physics simulator for generating the trajectory information, based on the flight state. The training data generation unit 111 may generate a plurality of sets of trajectory information including trajectory information corresponding to a trajectory of a false ball that can be detected by the ball detection unit 122, using a physics simulator for generating the trajectory information, based on the flight state.

In the computer, the information processing system, and the information processing method of the present embodiment, the trajectory information acquisition unit 123 acquires trajectory information indicating position change with respect to time change during flight of an estimation target ball, and the estimation unit 124 estimates a flight state which is a state of the estimation target ball that is flying, based on the trajectory information. Thus, it is possible to estimate the flight state from the trajectory information on the estimation target ball.

In the computer, the information processing system, and the information processing method of the present embodiment, the estimation unit 124 may estimate the flight state of the estimation target ball, based on the trajectory information acquired by the trajectory information acquisition unit 123, using an estimation model for estimating the flight state from the trajectory information, and the estimation model may be generated through learning using training data including a flight state of a learning ball and trajectory information obtained from the flight state. In this case, the flight state can be estimated with high accuracy.

In the computer, the information processing system, and the information processing method of the present embodiment, the training data generation unit 111 generates a plurality of sets of trajectory information each indicating position change with respect to time change during flight of a learning ball, respectively based on a plurality of different flight states which are states of the learning ball that is flying, and further generates a plurality of training data each including the flight state and the trajectory information associated with each other, and the model generation unit 112 generates an estimation model for estimating the flight state from the trajectory information, through learning using the training data. Thus, it is possible to provide an estimation model used for estimating a flight state which is a state of an estimation target ball that is flying, from trajectory information on the estimation target ball.

The invention claimed is:

1. A computer comprising:
a memory that stores computer program; and
processing circuitry, where the computer program, when executed by the processing circuitry, causes the processing circuitry to
generate a plurality of sets of trajectory information each indicating position change with respect to time change during flight of a learning ball, respectively based on a plurality of different flight states which are states of the learning ball that is flying, and further generate a plurality of sets of training data each including at least one of the plurality of different states and at least one of the plurality of sets of trajectory information associated with each other;
generate an estimation model for estimating the flight state from the trajectory information, through learning using the plurality of sets of training data;
acquire trajectory information on an estimation target ball, by detecting the estimation target ball included in moving images of the estimation target ball that is flying; and
estimate the flight state of the estimation target ball, based on the acquired trajectory information on the estimation target ball by using the estimation model,
wherein the processing circuitry generates the plurality of sets of trajectory information, by using a physics simulator, the physics simulator generating the trajectory information based on the flight state, the plurality of sets of trajectory information showing the distribution according to an error distribution of a detection position of the ball that can be detected on the moving images, the detection position of the ball being adjusted to reproduce the error distribution based on the generated estimation model.

2. The computer according to claim 1, wherein the flight state includes at least one of a velocity, a spin rate, and a direction of a spin axis of the ball.

3. A computer comprising:
a memory that stores computer program; and
processing circuitry, where the computer program, when executed by the processing circuitry, causes the processing circuitry to
generate a plurality of sets of trajectory information each indicating position change with respect to time change during flight of a learning ball, respectively based on a plurality of different flight states which are states of the learning ball that is flying, and further generate a plurality of sets of training data each including at least one of the plurality of sets of the flight state and at least one of the plurality of sets of the trajectory information associated with each other;
generate an estimation model for estimating the flight state from the trajectory information, through learning using the plurality of sets of training data;
acquire trajectory information on an estimation target ball, by detecting the estimation target ball included in moving images of the estimation target ball that is flying; and
estimate the flight state of the estimation target ball, based on the acquired trajectory information by using the estimation model,
wherein the processing circuitry generates the plurality of sets of trajectory information including trajectory information corresponding to a trajectory of a false ball that can be erroneously detected in the moving images of the estimation target ball that is flying, by using a physics simulator, the physics simulator generating the trajectory information based on the flight state.

4. An information processing method performed by a computer, comprising:
generating a plurality of sets of trajectory information each indicating position change with respect to time change during flight of a learning ball, respectively based on a plurality of different flight states which are states of the learning ball that is flying, and further generating a plurality of sets of training data each including at least one of the plurality of different states and at least one of the plurality of sets of trajectory information associated with each other;
generating an estimation model for estimating the flight state from the trajectory information, through learning using the plurality of sets of training data;
acquiring trajectory information on an estimation target ball, by detecting the estimation target ball included in moving images of the estimation target ball that is flying; and
estimating the flight state of the estimation target ball, based on the acquired trajectory information on the estimation target ball, by using the estimation model,
wherein the plurality of sets of trajectory information is generated, by using a physics simulator, the physics simulator generating the trajectory information based on the flight state, the plurality of sets of trajectory information showing the distribution according to an error distribution of a detection position of the ball that can be detected on the moving images, the detection position of the ball being adjusted to reproduce the error distribution based on the generated estimation model.

5. The information processing method according to claim 4, wherein
the flight state includes at least one of a velocity, a spin rate, and a direction of a spin axis of the ball.

6. An information processing method performed by a computer, comprising:
generating a plurality of sets of trajectory information each indicating position change with respect to time change during flight of a learning ball, respectively based on a plurality of different flight states which are states of the learning ball that is flying, and further generating a plurality of sets of training data each including at least one of the plurality of different states and at least one of the plurality of sets of trajectory information associated with each other;
generating an estimation model for estimating the flight state from the trajectory information, through learning using the plurality of sets of training data;

acquiring trajectory information on an estimation target ball, by detecting the estimation target ball included in moving images of the estimation target ball that is flying; and estimating the flight state of the estimation target ball, based on the acquired trajectory information on the estimation target ball, by using the estimation model, wherein generating the training data, the plurality of sets of trajectory information is generated, the plurality of sets of trajectory information including trajectory information corresponding to a trajectory of a false ball that can be erroneously detected in the moving images of the estimation target ball that is flying, by using a physics simulator for generating the trajectory information, based on the flight state.

7. The computer according to claim 1, wherein the processing circuitry is configured to acquire, from a portable terminal, the moving images captured by a camera of the portable terminal, the portable terminal being not fixed to a specific position.

8. The computer according to claim 7, wherein the processing circuitry is configured to acquire, from the portable terminal, at least one of angle view information of the camera and focal length information of the camera at the time of capturing the moving video.

9. The computer according to claim 7, wherein the portable terminal is a smartphone or a tablet device.

10. The computer according to claim 7, wherein the processing circuitry is configured to acquire, from the portable terminal, the trajectory information on the estimation target ball, the portable terminal receiving the estimation model from the computer and estimating the flight state based on the estimation model.

11. The computer according to claim 3, wherein the processing circuitry is configured to acquire, from a portable terminal, the moving images captured by a camera of the portable terminal, the portable terminal being not fixed to a specific position.

12. The computer according to claim 11, wherein the processing circuitry is configured to acquire, from the portable terminal, at least one of angle view information of the camera and focal length information of the camera at the time of capturing the moving video.

13. The computer according to claim 11, wherein the portable terminal is a smartphone or a tablet device.

14. The computer according to claim 11, wherein the processing circuitry is configured to acquire, from the portable terminal, the trajectory information on the estimation target ball, the portable terminal receiving the estimation model from the computer and estimating the flight state based on the estimation model.

* * * * *